United States Patent [19]
Yokota et al.

[11] Patent Number: 5,339,908
[45] Date of Patent: Aug. 23, 1994

[54] POWER TOOL

[75] Inventors: Takao Yokota; Juzaburo Monobe; Nobuhiro Sano, all of Fuchu, Japan

[73] Assignee: Ryobi Limited, Hiroshima, Japan

[21] Appl. No.: 84,317

[22] Filed: Jun. 25, 1993

Related U.S. Application Data

[63] Continuation of Ser. No. 972,887, Nov. 6, 1992, abandoned, which is a continuation of Ser. No. 771,365, Oct. 1, 1991, abandoned.

Foreign Application Priority Data

Oct. 2, 1990 [JP] Japan .............................. 2-103825[U]

[51] Int. Cl.$^5$ ............................................. F16H 3/44
[52] U.S. Cl. .................................... 173/216; 173/217; 475/298
[58] Field of Search ..................... 173/216, 217, 164; 475/298, 299

[56] References Cited

U.S. PATENT DOCUMENTS

| | | | |
|---|---|---|---|
| 3,872,742 | 3/1975 | States | 475/299 |
| 4,052,914 | 10/1977 | Nakajima | 475/299 X |
| 4,791,833 | 12/1988 | Sakai et al. | 475/299 |
| 4,892,013 | 1/1990 | Satoh | 475/299 X |
| 4,898,249 | 2/1990 | Ohmori | 475/299 X |

FOREIGN PATENT DOCUMENTS 61-209883 9/1986 Japan .
62-0229584 10/1987 Japan .

*Primary Examiner*—Rinaldi I. Rada
*Attorney, Agent, or Firm*—Brooks & Kushman

[57] ABSTRACT

A power tool has a speed reduction gear mechanism including a plurality of stages of planetary gear arrangements, a slide gear member disposed in a tool body to be axially movable therein to change revolution speed of the speed reduction mechanism, and a movable member operatively connected to the slide gear member for moving the same, the movable member having a ring shape and being disposed on an outer side of the slide gear member whereby the slide gear member can be smoothly moved.

15 Claims, 6 Drawing Sheets

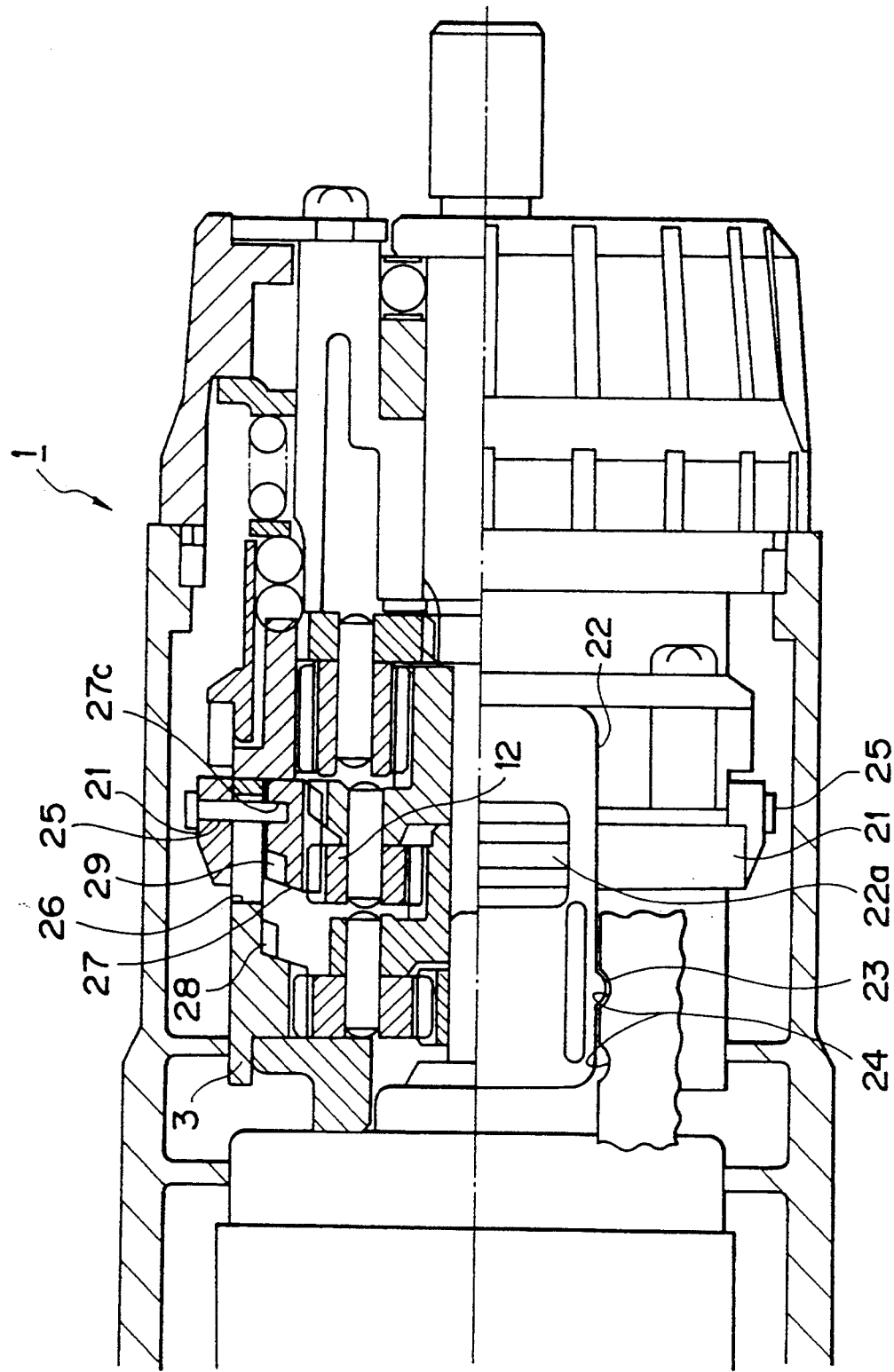

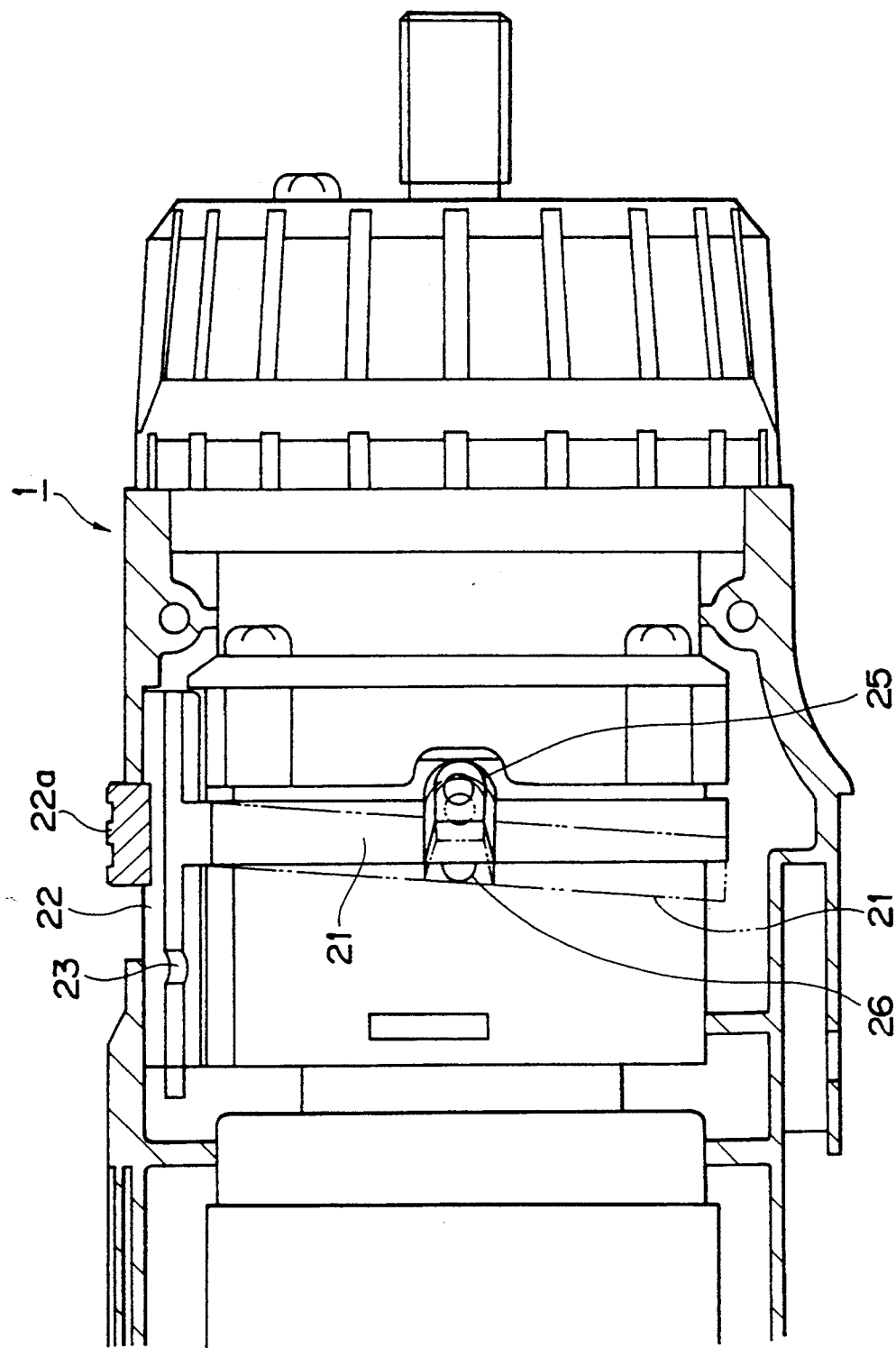

POWER TOOL

This is a continuation of copending application(s) Ser. No. 07/972,887 filed on Nov. 6, 1992 as a file wrapper continuation of prior application Ser. No. 07/771,365 which was filed Oct. 1, 1991, both abandoned.

BACKGROUND OF THE INVENTION

This invention relates to an electric motor driven tool, and more particularly, to a power tool including a speed reduction mechanism for changing the revolution speed of a tool.

In general, there is known a power tool in which the tool is driven by an electric motor through a gear speed reduction mechanism comprising a plurality of stages of planetary speed reduction mechanisms, such electric motor and speed reduction mechanisms being arranged in a tool body. The power tool further includes a trigger switch for carrying out "ON" or "OFF" switching operations of the motor. The tool is driven and rotated in a desired operation mode by operating the trigger switch.

In a conventional power tool of the character described above, the rotation speed of an output shaft of a gear speed reduction mechanism driven by an electric motor is switched from a low speed to a high speed or vice versa to thereby drive the tool with variable rotation speeds.

One example of such a power tool including a speed reduction mechanism is disclosed in Japanese Patent Laid-open Publications No. 61-209883 and No. 62-224584.

The speed reduction mechanism disclosed in these prior art references includes a slide gear member provided with an internal gear engaged with a plurality of planetary gears of the speed reduction mechanism. The slide gear member is disposed to be movable in its rotation axis direction and is supported to be rotatable or non-rotatable in accordance with its moved positions.

In a conventional power tool, an arcuate swing member is connected to such a slide gear member in a manner that the slide gear member can be moved by swinging the swing member by means of a speed change lever. Two kinds of speed reduction ratios can be obtained in accordance with the difference between the rotation speeds of the planet gears at both the rotation stop time of the slide gear member and the rotating time of the internal gear by the operation of the speed change lever, whereby a desired speed reduction operation can be performed.

In the conventional power tool of the described type, however, the slide gear member is moved by the swinging motion of the swing member, and moreover, since the swing member is formed so as to have an arcuate configuration, the swing member is subjected to an expansion deformation when a load is applied thereto. Thus, there causes a case in which the smooth motion of the slide gear member is not expected, resulting in less reliability of the speed changing operation. Furthermore, the requirement for the location of the speed change lever and the swing member will result in the increasing of the constructional members or parts as well as troublesome manufacturing workings thereof.

SUMMARY OF THE INVENTION

An object of the present invention is to substantially eliminate defects or drawbacks encountered in the prior art and to provide a power tool having a structure capable of smoothly changing a driving speed with an improved reliability.

Another object of the present invention is to provide a power tool having improved speed reduction gear arrangements capable of smoothly changing the engagement thereof for a high and a low speed driving operations of the tool.

These and other objects can be achieved according to this invention by providing a power tool comprising: a tool body to which a tool is mounted; a driving motor incorporated in the tool body and having an output shaft; a motor operating mechanism incorporated in the tool body for operating the driving motor; a speed reduction gear mechanism including a plurality of stages of planetary gear arrangements for transmitting a driving force of the driving motor to the tool to drive the same; a s l ida gear member disposed in the tool body to be axially movable therein, the slide gear member being provided with an internal gear to be meshed with planet gears of the planetary gear arrangement and adapted to change revolution speed of the speed reduction mechanism; and a movable member operatively connected to the slide gear member for moving the slide gear member, the movable member having a ring shape and being disposed on an outer side of the slide gear member.

In preferred embodiments, the slide gear member is constructed to be rotatable in a high speed driving operation and to be non-rotatable in a low speed driving operation. The movable member comprises a resilient support ring having a slide lever having an operating portion exposed outward of the tool body. A cylindrical gear case is further disposed on an output side of the motor in the tool body with a space from an inner surface of the tool body, the support ring being disposed in the space to be axially movable, the slide lever being integrally formed with the support ring.

The motor operating mechanism comprises a trigger switch for carrying out an ON-OFF switching operation of the motor, a rotation change lever operatively connected to the trigger switch to change rotation direction of the motor and a battery detachably mounted to the tool body for supplying an electric power to the motor.

The cylindrical gear case is disposed in the tool body and the speed reduction gear mechanism substantially disposed in the gear case comprises a first, a second and a third stages of planetary gear arrangements, the first stage planetary gear arrangement comprising a first sun gear mounted to the output shaft of the motor, a plurality of first stage planet gears meshed with a first sun gear and with an internal gear formed on the gear case, and a first support plate having one side surface on which are projected a plurality of pins to which the first stage planet gears are rotatably supported, respectively, the second stage planetary gear arrangement comprising a second sun gear integrally disposed on another side surface of the first support plate, a plurality of second stage planet gears meshed with a second sun gear and with an internal gear of the slide gear member, and a second support plate having one side surface on which are projected a plurality of pins to which the second stage planet gears are rotatably supported, the second support plate being provided with an external gear which is meshed with the internal gear of the slide gear member in accordance with an axial movement thereof; and the third stage planetary gear arrangement comprising a third sun gear integrally disposed on another side surface of the second support plate, a plurality of third stage planet gears meshed with the third sun gear and with an internal gear formed on the gear case, and a third support plate having one side surface on which are projected a plurality of pins to which the third stage planet gears are rotatably supported, the third support plate being secured to an external gear formed on the spindle shaft in a spline engagement.

According to the power tool having the characteristics described above, the annular support ring is axially movable by the operation of the slide lever which is easily operated by an operator. The slide gear is positioned by this movement in a rotatable or non-rotatable position to thereby carry out the desired driving speed changing operation. Accordingly, in a case where any load is applied to the support ring, the support ring can be prevented from deforming, whereby the slide gear member can be smoothly moved, resulting in the improvement of the speed changing reliability. This change of the driving speed can be surely transmitted to the spindle shaft through the driving speed reduction mechanism including improved planetary gear arrangements.

BRIEF DESCRIPTION OF THE DRAWINGS

For a better understanding of this invention and to show how the same is carried out, reference is first made, by way of preferred embodiments, to the accompanying drawings, in which:

FIG. 4 is a lateral sectional view of FIG. 2;

FIG. 5 is an explanatory view showing a function of a support ring; and

DESCRIPTION OF THE PREFERRED EMBODIMENT

Figure 1:
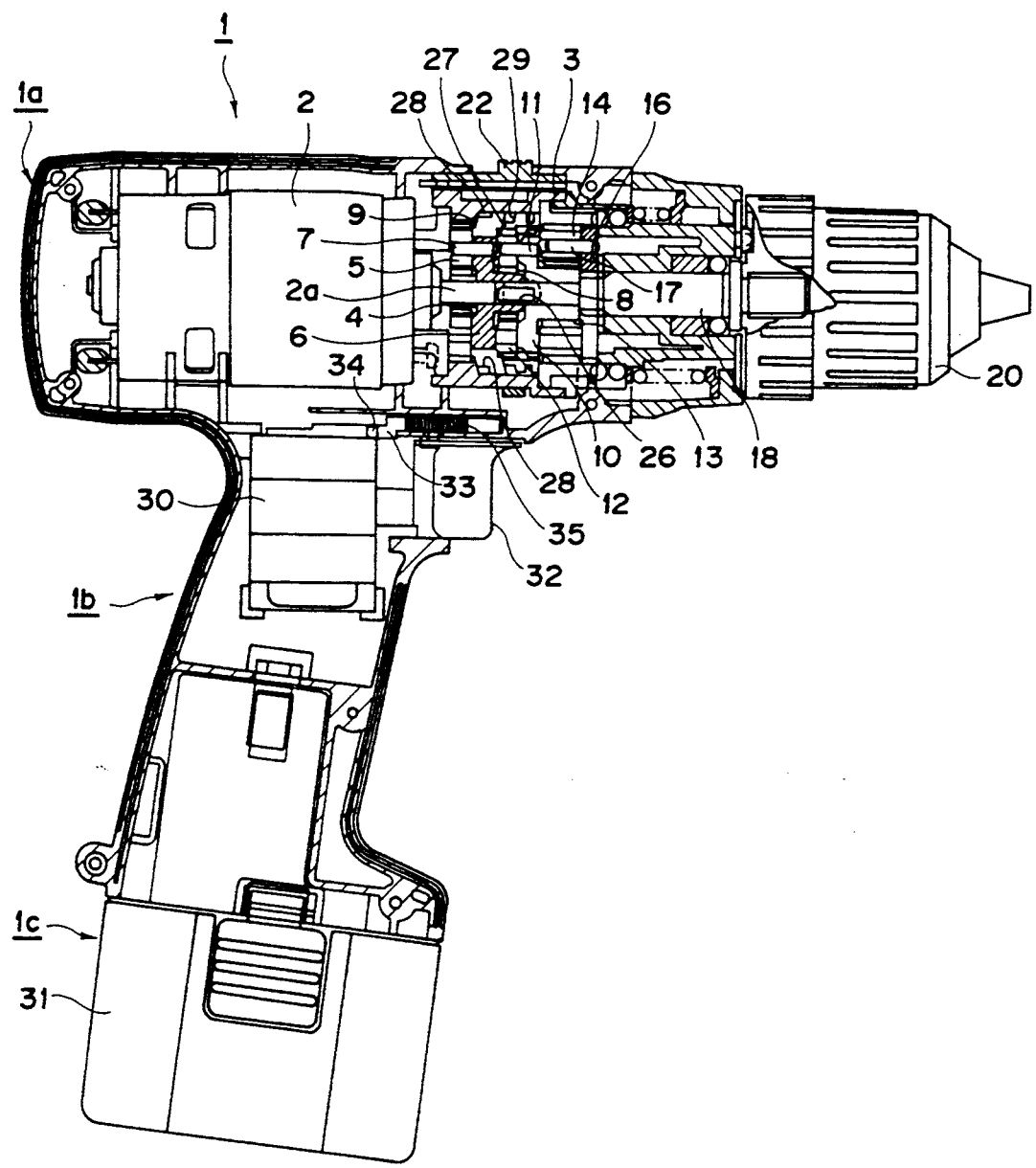
FIG. 1 is a longitudinal sectional view of a power tool according to the present invention.
Figure 2:
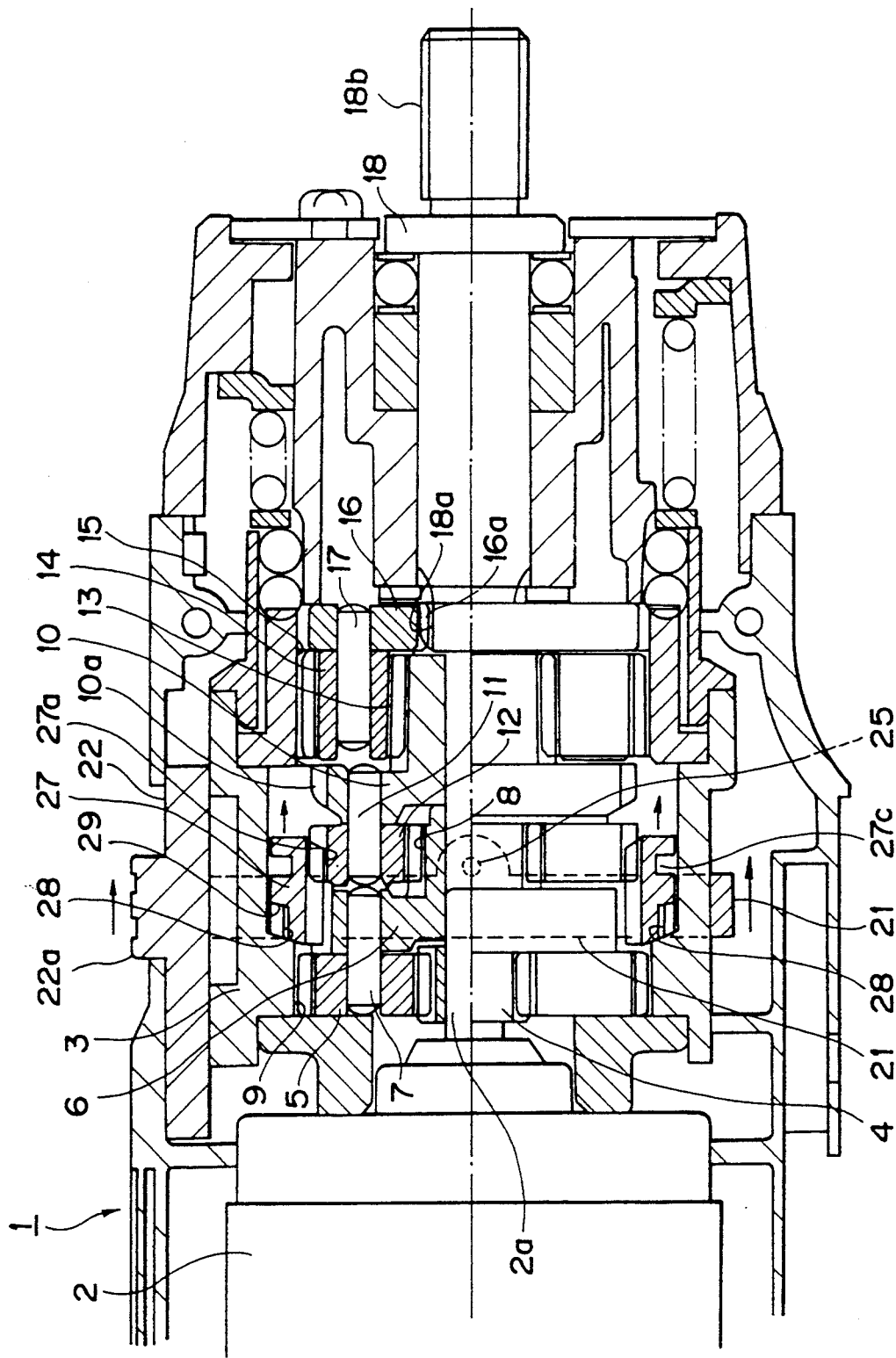
FIG. 2 is a sectional view showing a gear arrangement of the power tool of FIG. 1 in a low speed operation thereof.

Referring to FIGS. 1 and 2 showing one embodiment of a power tool according to this invention, a power tool comprises a hand-grip pistol-type tool body 1 provided with a cylinder portion 1$a$, a hand-grip portion 1$b$ and a grip end portion 1$c$. In the cylinder portion 1$a$ of the tool body 1, is disposed an electric motor 2 having an output shaft 2$a$, and a substantially cylindrical gear case 3 is disposed on the side of the output shaft 2$a$, the right side as viewed in FIG. 1, with a predetermined space between the gear case 3 and the inner surface of the tool body 1.

An output pinion 4 is mounted on the output shaft 2$a$ and a plurality of planet gears 5 constituting a first stage planetary reduction mechanism are meshed with the output pinion 4. The output pinion 4 may be called a first sun gear. These planet gears 5 are supported to be rotatable by pins 7 projected from one side of a first stage support plate 6. On the other side of this first stage support plate 6, a second sun gear 8 of a second stage planetary reduction mechanism is integrally formed. The gear case 3 is provided, on its inner surface, with an internal gear 9 with which the respective planet gears 5 are meshed.

The second sun gear 8 of the second reduction mechanism is meshed with a plurality of planet gears 12 rotatably supported by pins 11 projected from one side of a second stage support plate 10 having an outer periphery to which an external gear 10$a$ is formed. A third sun gear 13 of a third stage planetary reduction mechanism is integrally formed to the other side of the second stage support plate 10.

A plurality of third planet gears 14 are meshed with the third stage sun gear 13, and on the outer side of the respective planet gears 14 is arranged an internal gear 15 which stationarily abuts against the gear case 3 so that the internal gear 15 is meshed with the planet gears 14. The respective planet gears 14 are arranged to be rotatable about pins 15 secured to a third stage support plate 16. An inside portion 16$a$ of the third stage support plate 16 is secured to an external gear 18$a$ formed on a spindle shaft 18 through a spline engagement. As shown in FIG. 2, the spindle shaft 18 has a front end portion 18$b$ to which a chuck 20 (FIG. 1) for mounting a desired tool is mounted. As described above, the gear speed reduction mechanism is comprised of the first, second and third stage planet gears, sun gears and support plates for rotating and driving the tool.

An annular support ring 21 formed of a material such as resin, rubber or metal (e.g., iron and spring steel) having a resiliency or springy property is arranged to be movable in a predetermined space formed between the inner surface of the tool body 1 and the outer surface of the gear case 3. A slide lever 22 is arranged outside, on the upper side as viewed in FIG. 2, of the support ring 21 in a manner that an upper operating portion 22$a$ of the slide lever 22 is exposed outwardly of the tool body 1 in a state as shown in FIGS. 6($a$) to 6($c$).

Figure 6A:
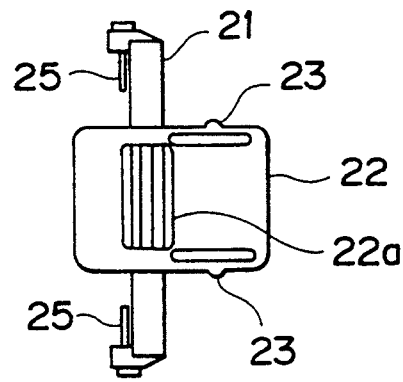
FIGS. 6($a$), 6($b$) and 6($c$) are a front, a plan and a side, partially in section, views of one example of the support ring.
Figure 6B:
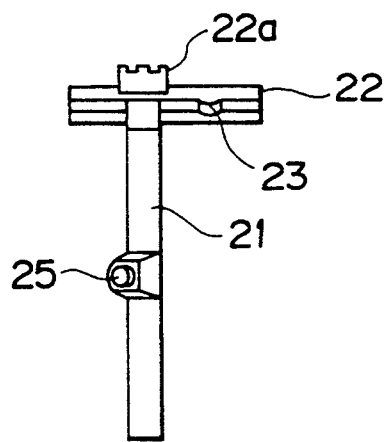
Figure 6C:
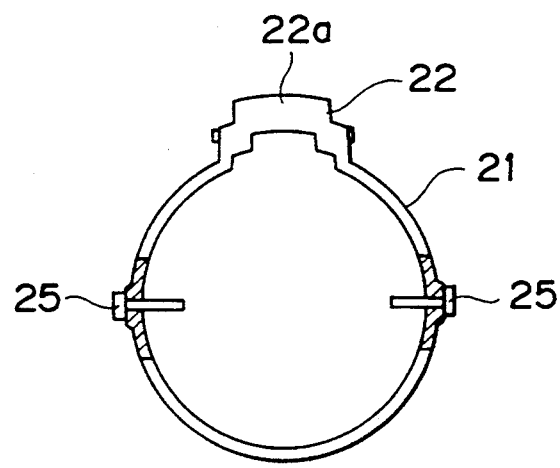

Projections 23 serving as engaging pieces are formed, as shown in FIGS. 4 and 6($a$), on both the upper and lower edge portions of the slide lever 22, and the tool body 1 is provided with recessed portions 24 for receiving the projections 23 in engagement therewith at predetermined low and high speed operating positions of the tool body 1. A pair of guide pins 25 are formed on both side portions of the support ring 21 so as to project inwardly. The guide pins 25 extend so as to penetrate guide holes 26 axially formed in both the side portions of the gear case 3 towards the inside of the gear case 3.

A slide gear member 27 is provided with an internal gear 27$a$ meshed with the planet gears 12 and is arranged to be axially movably inside the gear case 3 at a portion corresponding to the outside portion of the planet gears 12 meshed with the second stage sun gear 8. The slide gear member 27 is provided with an annular recessed portion 27$c$ to which the inner end of the guide pins 25 of the support ring 21 are fitted to thereby rotate the slide gear member 27. A plurality of projections 28 are formed at a portion near the internal gear 9 of the gear case 3 and a plurality of recessed portions 29 are also formed on the outer peripheral surface of the slide gear member 27 so that the projections 28 are engageable with the recessed portions 29.

When the slide lever 22 is operated, in FIG. 4, so that the engaging projection 23 thereof is engaged with the recessed portion 24 of the tool body 1, the support ring 21 is displaced in the axial direction. According to this axial displacement of the support ring 21, the guide pin 25 now engaging with the annular recess 27$c$ of the slide gear member 27 is moved along the guide hole 26 of the gear case 3, and the slide gear member 27 is hence moved along the axial direction. When the slide gear member 27 is moved rearwardly and the engaging projections 28 of the gear case 3 are then engaged with the recessed portions 29 of the slide gear member 27, the slide gear member 27 is inhibited in its rotation and maintains its stationary state and the support plate 10 is rotated at a low speed as shown in FIG. 2. Accordingly, FIG. 2 represents a low speed driving operation.

Figure 3:
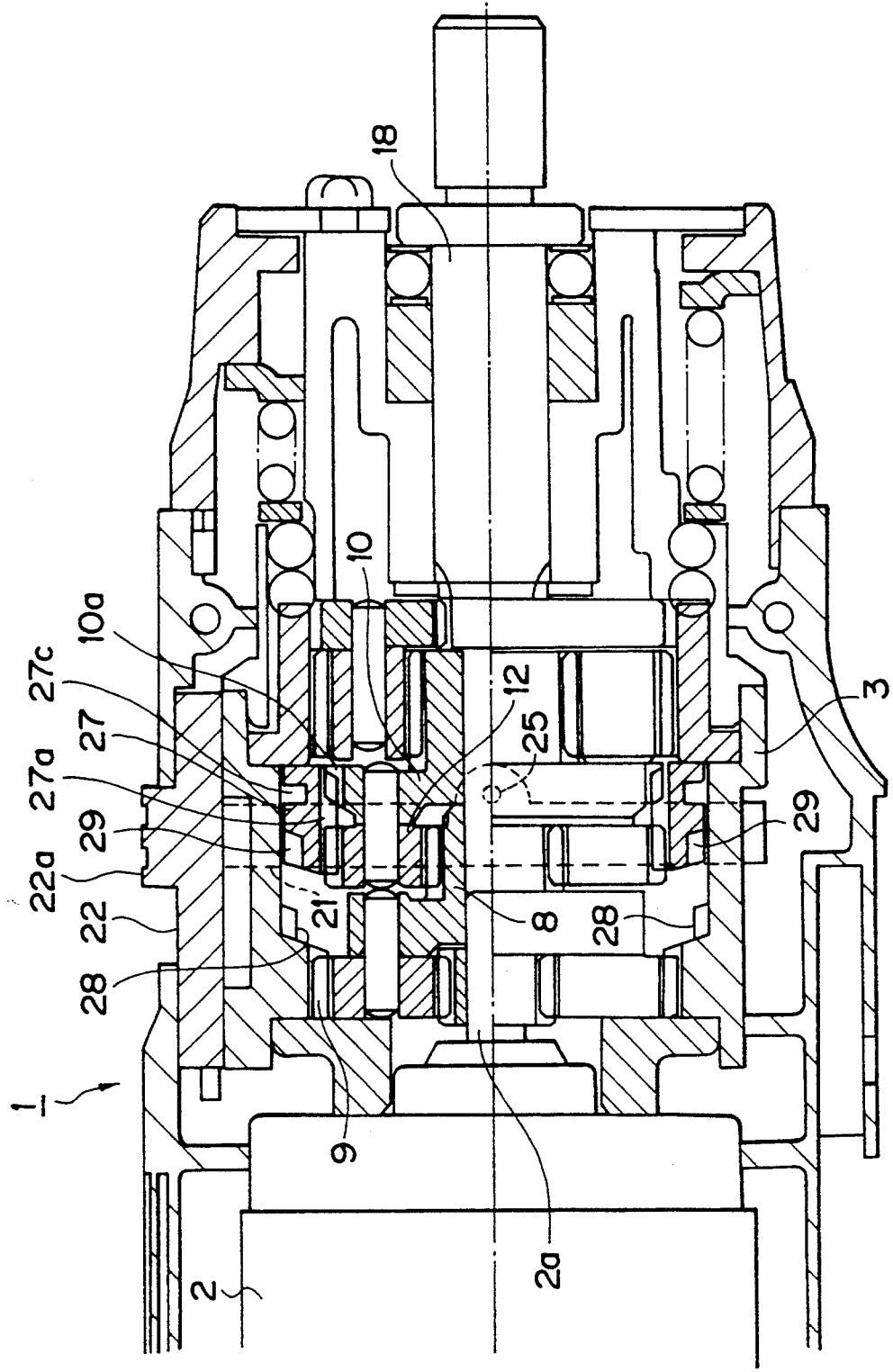
FIG. 3 is a sectional view similar to FIG. 2, showing the gear arrangement in a high speed operation.

In the meantime, when the slide gear member 27 is moved forwardly and the engagement between the recessed portions 29 of the slide gear member 27 and the engaging projections 28 of the gear case 3 is released, the slide gear member 27 is made rotatable. The engagement of the external gear 10a of the support plate 10 with the internal gear 27a of the slide gear member 27 allows the second sun gear 8 and the planet gears 12 and the support plate 10 to rotate together, thus the support plate 10 being rotated at a high speed as shown in FIG. 3. Accordingly, FIG. 3 represents a high speed driving operation.

Reference is now made back to FIG. 1, in which a switch unit 30 for controlling the switching of the operation of the motor 2 is accommodated in the hand-grip portion 1b of the tool body 1 below the motor 2, and a battery 31 for supplying an electric power to the motor 2 is detachably mounted to the grip end portion 1c of the tool body 1.

A trigger switch 32 is incorporated in the tool body 1 in an electrical connection with the switch unit 30 for carrying out switching operation, i.e. ON or OFF switching operation, of the switch unit 30. A rotation change lever 33 for changing the rotating direction of the motor 2 is disposed in the tool body 1 above the trigger switch 32, and the rotation change lever 33 is pivoted about a pivot pin 34 disposed at the central portion of the lever 33. On both sides of the front end of the rotation switch lever 33 are integrally formed operation projections 35, respectively, so as to project outward from both the sides of the tool body 1.

In an actual operation of the power tool of the present embodiment, an operator grips the hand-grip portion 1b and presses forwardly the operation projections 35 with a finger of the operator, whereby the rotation change lever 33 is operated to rotate the switch unit 30 through a rotation switch pin thereof.

The power tool of the structure described above will operate as follows.

First, as shown in FIG. 2, in a case where the power tool is driven at a low driving speed, the slide lever 22 is shifted rearward, leftward as viewed in FIG. 2, to engage the engaging projection 23 with the recessed portion 24 (FIG. 4) Of the tool body 1 for carrying out the low speed operation, and the slide gear member 27 is then moved to engage the recessed portions 29 of the slide gear member 27 with the engaging projections 28 of the gear case 3 to thereby maintain the slide gear member 27 to a non-rotatable state.

The operator holds the hand-grip portion 1b of the tool body 1 and pulls the trigger switch 32 to turn on the switch unit 30. The switch unit 30 then generates a signal to the motor 2 to drive the same. The rotation driving force of the motor 2 is transmitted to the spindle shaft 18 in a speed reduced manner through the output pinion 4, the respective stage planet gears 5, 12, 14, and the sun gears 8, 13, whereby the tool mounted to the chuck 20 is rotated to carry out the predetermined working. During this low speed operation, since the slide gear member 27 is secured in a non-rotatable manner, the second stage planet gears 12 are rotated with the teeth thereof being meshed with the teeth of the internal gear of the slide gear member 27 in the stationary state, thus increasing the speed reduction ratio and hence the spindle shaft 18 is rotated with a reduced speed.

On the contrary, as shown in FIG. 3, in a case where the power tool is operated with a high rotation speed, the slide lever 22 is shifted frontward, i.e. rightward as viewed in FIG. 3, to engage the engaging projection 23 with the recessed portion 24 (FIG. 4) of the tool body 1. In the next step, by moving the slide gear member 27, the recessed portions 29 of the slide gear member 27 is released from the engaging projections 28 of the gear case 3, and the internal gear 27a of the slide gear member 27 is meshed with the external gear 10a of the support plate 10, whereby the slide gear member 27, support plate 10 and the sun gear 8 are integrally operated, thus maintaining the slide gear member 27 in a rotatable state.

With this state, when the operator operates the trigger switch 32, the motor 2 is driven through the switch unit 30, and the rotation driving force from the motor 2 is transmitted to the spindle shaft 18 through the output pinion 4, the respective stage planet gears 5, 12, 14 and the sun gears 8 and 13 at a high rotation speed. During this high speed operation, since the slide gear member 27 is in the rotatable state, the slide gear member 27 is rotated together with the second stage planet gears 12, the sun gear 8 and the support plate 10, thus decreasing the speed reduction ratio, whereby the spindle shaft 18 is rotated at a high speed.

Therefore, as described above, according to the power tool of the present invention, the operation of the power tool can be easily switched to a high or low rotating speed.

Referring to FIG. 5, when the slide lever 22 is shifted, there may cause a case where the slide gear member 27 fails to be engaged with the teeth of the planetary gears 12. In such a case, however, since the support ring 21 is formed of a springy material, the engagement therebetween can be achieved by the springy property of the support ring 21 when the motor 2 is driven.

Since the operation change lever 33 is operated by the operator by pressing the operation projections 35, the switch unit 30 can be operated in the reversible manner, thus switching the rotating direct/on of the driving motor 2.

As described above, according to the present invention, since the support ring 21 is formed in a ring shape and disposed axially movably to carry out the speed changing operation, the deformation of the support ring 21 can be surely prevented even in a case where a load is applied to the support ring 21, resulting in the smooth movement of the slide gear member 27 and hence remarkably improving the speed changing reliance. Moreover, since the slide lever 22 is integrally formed with the support ring 21, the number of tile parts or elements can be reduced as well as easy manufacturing thereof.

It is to be understood that the present invention is not limited to the described embodiment and many other changes and modifications may be made without departing from the scope of the appended claim.

What is claimed is:

1. A power tool for driving a tool implement comprising:
   a tool body;

a driving motor incorporated in the tool body and having an output shaft;

means incorporated in the tool body for operating the driving motor;

a speed reduction gear mechanism including a plurality of stages of planetary gear sets for transmitting a driving force of the driving motor through the planetary gear sets to a tool implement to drive the same, wherein said planetary gear sets include a slide gear member axially movable between a forward position and a rearward position, said slide gear member being provided with an internal gear to be meshed with one of the gears constituting the planetary gear sets to change rotating speed of the tool implement;

a resilient support ring in the shape of a circular ring, integrally formed with a slide lever, to rotatably support said slide gear member, said slide lever being disposed axially movably relative to the tool body;

engaging means disposed between the slide lever and the tool body for selectively holding the slide lever at either one of a forward position or a rearward position against the tool body for changing a rotating speed of the tool implement;

said resilience support ring being sufficiently resiliently deformed in an axial direction of said tool body when said slider lever is held by the engaging means at the forward position and the slide gear member is not meshed with the one of gears constituting the planetary gear sets such that the slide gear is automatically shifted in a direction opposite to a deformed direction to engage with said one of the gears constituting the planetary gear sets when the driving motor is started to drive; and said resilience support ring being sufficiently resiliently deformed in an axial direction of said tool body when said slider lever is held by the engaging means at the rearward position and the slide gear member is not meshed with the tool body such that the slide gear member is automatically shifted in a direction opposite to a deformed direction to engage the slide gear member with the tool body when the driving motor is started to drive.

2. A power tool according to claim 1, wherein said slide gear member has means for engaging with one of the gears constituting the planetary gear sets to be rotatable at a predetermined position in a high speed driving operation.

3. A power tool according to claim 2, wherein said slide gear member has means for engaging relative to the tool body to be non-rotatable at another predetermined position in a lower speed driving operation.

4. A power tool according to claim 3, wherein said slide gear member is provided with a recessed portion and said tool body is provided with projection to be engaged with the recessed portion and wherein said glide gear member is non-rotatable when said recessed portion is engaged with said projection and is rotatable when said recessed portion is released from said projection.

5. A power tool according to claim 1, wherein said support ring is made of a resilient resin.

6. A power tool according to claim 1, wherein said support ring is made of rubber.

7. A power tool according to claim 1, wherein said support ring is made of a resilient metal.

8. A power tool according to claim 1, further including a cylindrical gear case disposed within the tool body with a space being formed therebetween, said support ring being disposed in said space to be axially movable.

9. A power tool according to claim 8, wherein said slide lever is provided with engaging portions and said tool body is provided with a plurality of portions to be engaged with the engaging portions of the slide lever for positioning the slide lever at low or high speed driving positions.

10. A power tool according to claim 9, wherein said engaging portions are projections formed on sides of the slide lever and said portions to be engaged are recessed portions formed on the tool body.

11. A power tool according to claim 10, wherein said support ring has a pair of guide pins projecting inwardly and said gear case is provided with axial holes through which said guide pins penetrate inwardly and wherein said slide gear member is provided with an annular recess formed on an outer peripheral surface of the slide gear member and inner ends of the said guide pins are fitted in said annular recess so that the slide gear member is rotated and axially movable together with movement of said support ring.

12. A power tool according to claim 1, wherein said means for operating the motor comprises a trigger switch for carrying out an ON-OFF switching operation of the motor, a rotation change lever operatively connected to said trigger switch to change rotation direction of the motor and battery means detachably mounted on the tool body for supplying an electric power to the motor.

13. A power tool according to claim 14, wherein said rotation change lever has a central portion at which is disposed a pivot pin about which the rotation change lever is pivoted and an operation projection which is operated by an operator is integrally formed on a front end portion of the rotation change lever.

14. A power tool according to claim 1, wherein a cylindrical gear case is disposed in said tool body and said speed reduction gear mechanism substantially disposed in said gear case comprises a first, a second and a third stages of planetary gear arrangements, said first stage planetary gear arrangement comprising a first sun gear mounted to the output shaft of the motor, a plurality of first stage planet gears meshed with said first sun gear and with an internal gear formed on the gear case, and a first support plate having one side surface to which are projected a plurality of pins to which said first stage planet gears are rotatably supported, respectively;

said second stage planetary gear arrangement comprising a second sun gear integrally disposed on another side surface of said first support plate, a plurality of second stage planet gears meshed with said second sun gear and with an internal gear of said slide gear member, and a second support plate having one side surface on which are projected a plurality of pins to which said second stage planet gears are rotatably supported, said second support plate being provided with an external gear which is meshed with said internal gear of the slide gear member in accordance with an axial movement thereof; and said third stage planetary gear arrangement comprising a third sun gear integrally disposed on another side surface of said second support plate, a plurality of third stage planet gears meshed with said third sun gear and with an internal gear formed on the gear case, and a third support plate having one side surface on which are projected a plurality of pins to which said third stage planet gears are rotatably supported, said third support plate being secured to an external gear formed on a spindle shaft in a spline engagement.

15. A power tool according to claim 1, wherein said tool body is of a pistol type having a cylindrical portion, a hand-grip portion and a grip end portion.

* * * * *